United States Patent
Mizuno (10) Patent No.: US 7,103,712 B2
(45) Date of Patent: Sep. 5, 2006

(54) ISCSI STORAGE MANAGEMENT METHOD AND MANAGEMENT SYSTEM

(75) Inventor: Makio Mizuno, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 387 days.

(21) Appl. No.: 10/367,016

(22) Filed: Feb. 14, 2003

(65) Prior Publication Data

US 2004/0117546 A1 Jun. 17, 2004

(30) Foreign Application Priority Data

Dec. 11, 2002 (JP) .......................... 2002-358977

(51) Int. Cl.
*G06F 12/00* (2006.01)

(52) U.S. Cl. ........................... 711/112; 710/104
(58) Field of Classification Search ................ 711/112, 711/156, 170; 710/104; 709/223, 310; 370/401, 370/406
See application file for complete search history.

(56) References Cited

U.S. PATENT DOCUMENTS

| 2002/0029281 A1 | 3/2002 | Zeldner et al. |
| 2002/0083120 A1 | 6/2002 | Soltis |
| 2002/0095547 A1 | 7/2002 | Watanabe et al. |
| 2002/0161871 A1 | 10/2002 | Shanthaveeralah et al. |
| 2002/0194407 A1 | 12/2002 | Kim |
| 2003/0061331 A1 * | 3/2003 | Nakamura et al. .......... 709/223 |
| 2003/0177174 A1 | 9/2003 | Allen et al. |
| 2003/0217212 A1 | 11/2003 | Kim |
| 2003/0229689 A1 | 12/2003 | Raghavan et al. |
| 2004/0022256 A1 | 2/2004 | Green |
| 2004/0049572 A1 | 3/2004 | Yamamoto et al. |
| 2004/0059822 A1 | 3/2004 | Jiang et al. |
| 2004/0139237 A1 | 7/2004 | Rangan et al. |

FOREIGN PATENT DOCUMENTS

JP 2001-228977 8/2001

* cited by examiner

*Primary Examiner*—Hiep T. Nguyen
(74) *Attorney, Agent, or Firm*—Mattingly, Stanger, Malur & Brundidge, P.C.

(57) ABSTRACT

To provide an interface between iSCSI storage devices and a device managing the storage devices for accommodating status changes in the iSCSI storage devices, a table for managing the storage devices is provided within storage. When a status change occurs, the table is updated, while a status change notice is issued from the storage devices to the storage management device to bring information into consistency.

20 Claims, 8 Drawing Sheets

| Index | iSCSI Name | STATUS | |
|---|---|---|---|
| | | ENABLE / DISABLE | USED / NO USED |
| 1 | Name 1 | Enable | Used |
| 2 | Name 2 | Disable | No used |

[MISMATCH WITH REGISTERED INFORMATION]

ISCSI STORAGE MANAGEMENT METHOD AND MANAGEMENT SYSTEM

FIELD OF THE INVENTION

The present invention relates to a network storage subsystem using disk control units including plural input-output ports connectable to a network, and a management method for the same, and more particularly to an interface technology between storage and a management device for accommodating status changes of the storage.

BACKGROUND OF THE INVENTION

There is a disk control unit that performs data reading and writing for plural disk drive units. A combination of the disk drive units and the disk control unit is referred to as a disk subsystem. Such a disk subsystem is disclosed in the Japanese Patent Application Laid-open No. 2001-228977.

Connection topology between a host computer and the disk subsystem are changing with technological backgrounds and users' needs. Generally, storage has been connected directly to a computer such as a host computer through an interface such as SCSI. Such storage is referred to as direct attached storage (DAS). In recent years, the amount of data processed by enterprises and general users has been continuing to increase explosively because of widespread use of electronic commerce and the use of applications using databases such as dataware house and multimedia data.

In the DAS connection mode, all requests arrive in storage via a host computer. Therefore, data backup and other operations heavily load the host computer and worsen response, and at the same time increase the load of a network such as LAN connecting the host computer, leading to the deterioration of the whole response. It becomes necessary to expand storage to provide for the explosive increase of data, which means that storage under control of a host computer must be individually expanded, requiring cumbersome operations.

From such a background, a storage area network (SAN) has emerged that connects a host computer and storage by a storage dedicated network different from a network such as LAN connecting host computer. Building the storage dedicated network provides merits such as lessening the load of a network connecting the host computer and speeding up a data backup operation. Also, since the storage can be managed in a centralized form, the system administrator is less loaded.

It is general to build SAN using fiber channels as an interface for building the system. Primarily, as the fiber channels, optical fiber cables connectable as far as tens of kilometers are used. Presently, the optical fiber cables provide a high-speed interface that provides a transfer speed of 2 Gbps and has higher performance than SCSI.

On the other hand, as disadvantages, initial installation costs are required to build a new network, a managerial load increases because of use of networks of two systems, and interoperability between fiber channel devices is not guaranteed.

Accordingly, attention is directed to SAN that can integrate networks of two systems and uses IP networks having many achievements in LAN and the like. In recent years, the explosive widespread use of the Internet and the emergence of gigabit Ethernet (Ethernet is a registered trademark) have rapidly promoted the prevalence, speedup, and band expansion of network infrastructure. Here, SAN using fiber channels and SAN using IP networks are differentiated as FC-SAN and IP-SAN, respectively.

iSCSI (Internet SCSI) is available as a protocol for accessing SCSI devices on the IP networks. iSCSI is a protocol for forwarding to IP networks TCP packets with unit packets called iSCSI PDU (iSCSP Protocol Data Unit) capsuled in a datagram portion thereof.

IP networking using iSCSI as a protocol for accessing SCSI devices are described in U.S. patent application Ser. No. 2002/0,029,281 A1, U.S. patent application Ser. No. 2002/0,083,120 A1 and U.S. patent application Ser. No. 2002/0,095,547 A1.

In conventional IP networking, devices connected to a network are computers such as a host computer, and communication with them is enabled in the Internet world after making a query to DNS (Domain Name Server) managing device names and addresses.

Since no storage devices have existed on IP networks heretobefore, storage devices cannot be managed with conventional DNS. Accordingly, iSNS (internet Storage Name Service) is proposed as the framework of IP storage device management.

iSNS is a protocol for managing computers such as a host computer and servers, and storage devices that exist on a certain network. In other words, the iSNS protocol can accommodate status changes such as addition and deletion of storage devices to and from the network, and addition of servers thereto.

However, with the iSNS, it is difficult to accommodate internal changes of the storage devices existing on the network.

For example, several thousands of disks are used in a large-scale disk subsystem designed for enterprises. The following function is achieved using the high-capacity disks: a copy of a certain data volume is created as a standby system within the identical disk subsystem, and when a failure occurs in a volume under normal operation, processing is switched to the standby system to continue the job, or the copied volume is assigned to a different job to perform parallel operation. For the copied volume, device information must be set to make it available to devices on the network. The volume is one that has been newly created within the disk subsystem, not newly created on the network. It means that the presence of the volume is unknown to devices on the network outside the disk subsystem, so that the above described function cannot be used.

Thus, although conventional storage management can accommodate status changes on the network, it cannot accommodate status changes such as data copy and data movement within storage.

SUMMARY OF THE INVENTION

An object of the present invention is to provide an interface between storage and a management device that can accommodate status changes of the storage devices of disk subsystems existing on a network.

Another object of the present invention is to provide a storage management method and a management system that can accommodate dynamic status changes occurring within storage of the storage devices of disk subsystems existing on a network.

In accordance with one aspect, the invention is embodied in a system that has disk subsystems existing on a network and a device managing the storage of the disk subsystems, and includes a module that, upon the occurrence of status changes within the disk subsystems, reports the internal status changes from the disk subsystems to the device managing the storage of the disk subsystems. The internal status changes refer to dynamic changes such as data volume copy and disk expansion/reduction.

In accordance with another aspect, the invention is embodied in a system that has disk subsystems existing on a network and a device managing the storage of the disk subsystems, and provides a storage device management table in an area sharable within the disk subsystems, wherein the storage device management table is used to record status changes within the disk subsystems and manage the storage devices.

When a modification to the storage device management table occurs, a message indicating the modification of the contents is sent from a device having an interface with the network to a storage management device. Upon receiving the message, the storage management device updates a database and informs all devices on the network of the fact, and at the same time displays the fact on the storage management device.

The present invention is also characterized in that the storage identification information managed in the storage device management table is iSCSI name.

The present invention is also characterized in that, upon the occurrence of status changes within disk subsystems existing on a network, it reports the internal status changes from the disk subsystems to the storage identification information management device.

According to the present invention, devices existing a network can be managed to accommodate dynamic status changes within the devices (e.g., disk subsystems).

DETAILED DESCRIPTION OF THE PREFERRED EMBODIMENTS

Hereinafter, embodiments of the present invention will be described in detail. Herein, a description will be made of embodiments of iSCSI storage management employing iSNS as the framework of IP storage device management.

iSNS provides a protocol for achieving management of not only storage devices existing on an IP network but also fiber channel devices. They are managed by a device called an iSNS server. Major functions of the iSNS server are device information registration, discovery (device detection) function, zoning, and management of status changes of the network and devices.

<First Embodiment>
(increasing or decreasing disks within a disk subsystem)

Hereinafter, iSCSI storage management according to a first embodiment of the present invention will be described in detail.

Figure 1:
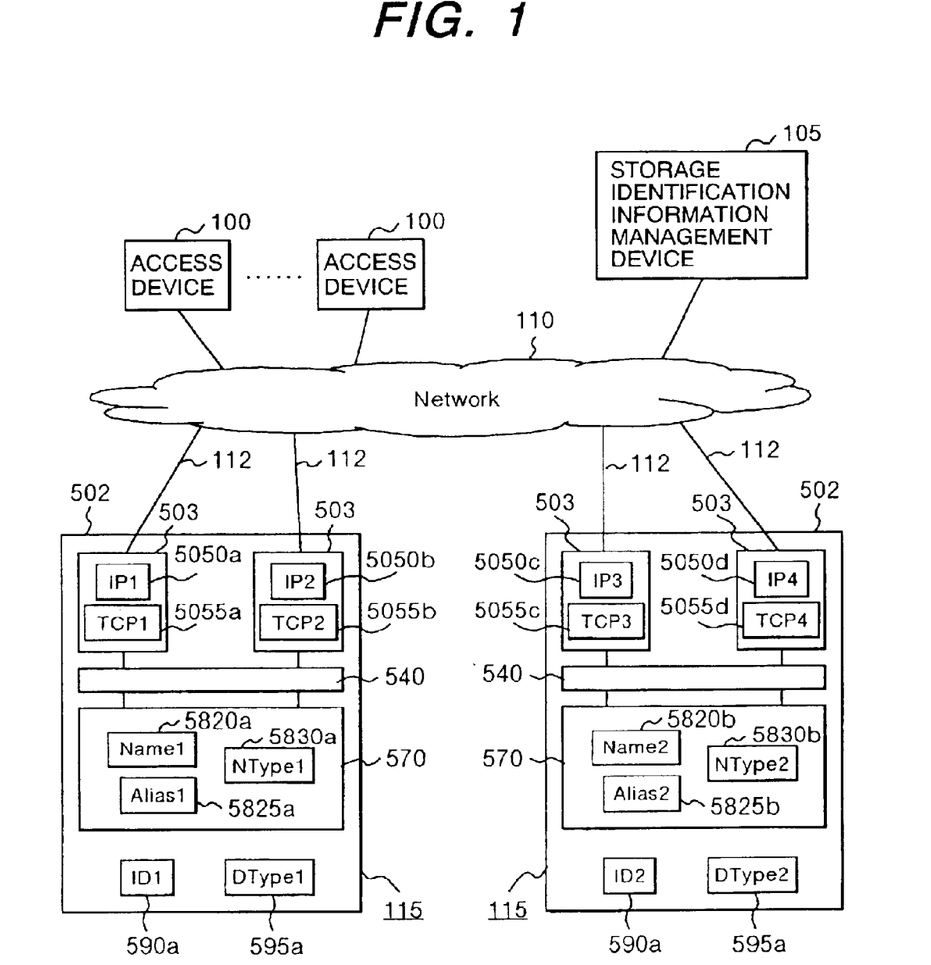
FIG. 1 is a diagram showing an overall configuration of a first embodiment of the present invention.

FIG. 1 is a diagram showing an overall configuration including access devices, a storage identification information management device, and storage devices of a first embodiment of the present invention.

The reference numeral 100 denotes access devices which can make access to storage devices such as a host computer and servers. The reference numeral 105 denotes a storage identification information management device which is a server for managing initiators (access devices) and targets (storage devices) existing on a network.

The reference numeral 110 denotes a network typified by LAN, WAN, and the like which is primarily configured with network devices such as switches and routers. The reference numeral 112 denotes communication routes which are media such as Fast Ethernet (Ethernet is a registered trademark), Gigabit Ethernet, and a fiber channel through which communication packets can be forwarded to the network.

The reference numeral 115 denotes storage devices as network entities which have storage such as disk drives. The storage devices 115 are generally configured with disk control units 502 having an interface with the network 110, portals 503, and the like. The disk control unit 502 includes channel control parts 505 (see FIG. 2) and a disk drive unit 560 (see FIG. 2) having one or more disks and a disk interface, and controls the disk drive unit 560 (see FIG. 2). The storage devices 115 further include a network for connecting the disk control unit 502 and the disk drive unit 560. The storage devices 115 and the storage identification information management device 105 include communication means for communicating information about dynamic status changes of disks within the disk drive unit 560 with each other.

The storage devices (network entities) 115 have one or more portals 503. The portals 503 have an interface with the network. The portals 503 contain an IP address and a TCP port number by which the portals 503 can be identified.

As IP addresses, as shown in FIG. 1, four different IP addresses IP1, IP2, IP3, and IP4 are set as 5050a, 5050b, 5050c, and 5050d, respectively, and defined in the portals 503 of the storage devices 115. For operation by private addresses, identical addresses may exist among IP1, IP2, IP3, and IP4.

Each portal 503 can manage plural TCP port numbers such as TCP1 (5055a), TCP2 (5055b), TCP3 (5055c), and TCP4 (5055d). For example, when two requests are accepted in IP1, although IP addresses are of course identical, if the TCP port numbers of the requests are different, the issuers of the requests can be identified.

The reference numeral 570 denotes storage nodes which correspond to single initiators and targets. The storage nodes 570 define a name, alias, and device type for identifying them.

Device identifiers 5820*a* and 5820*b* must be worldwide unique names 5825*a* and 5825*b* denote aliases to which names easily recognizable to users can be assigned. Node types 5830*a* and 5830*b* indicate whether the storage nodes 570 are initiators or targets. Network entity IDs 590*a* and 590*b* are represented in the form of a text character string as, e.g., URL. Device types 595*a* and 595*b* indicate types of protocols with which the network entities comply. An example is iSCSI.

Since to start communication requires identification information (e.g., URL for the Internet) of a target device, access to the iSNS server 105. Information such as attributes and identification information (iSCSI name for iSCSI and WWPN for fiber channel) about the target device is obtained from the iSNS server.

The target storage device 115 registers device information in the iSNS server 105 to indicate to other devices 100 that the device exists on the network. If the storage device 115 is registered in the iSNS server, a database on the storage device is created in the server. The devices 100 can start communication after querying the database and obtaining other device information.

Figure 2:
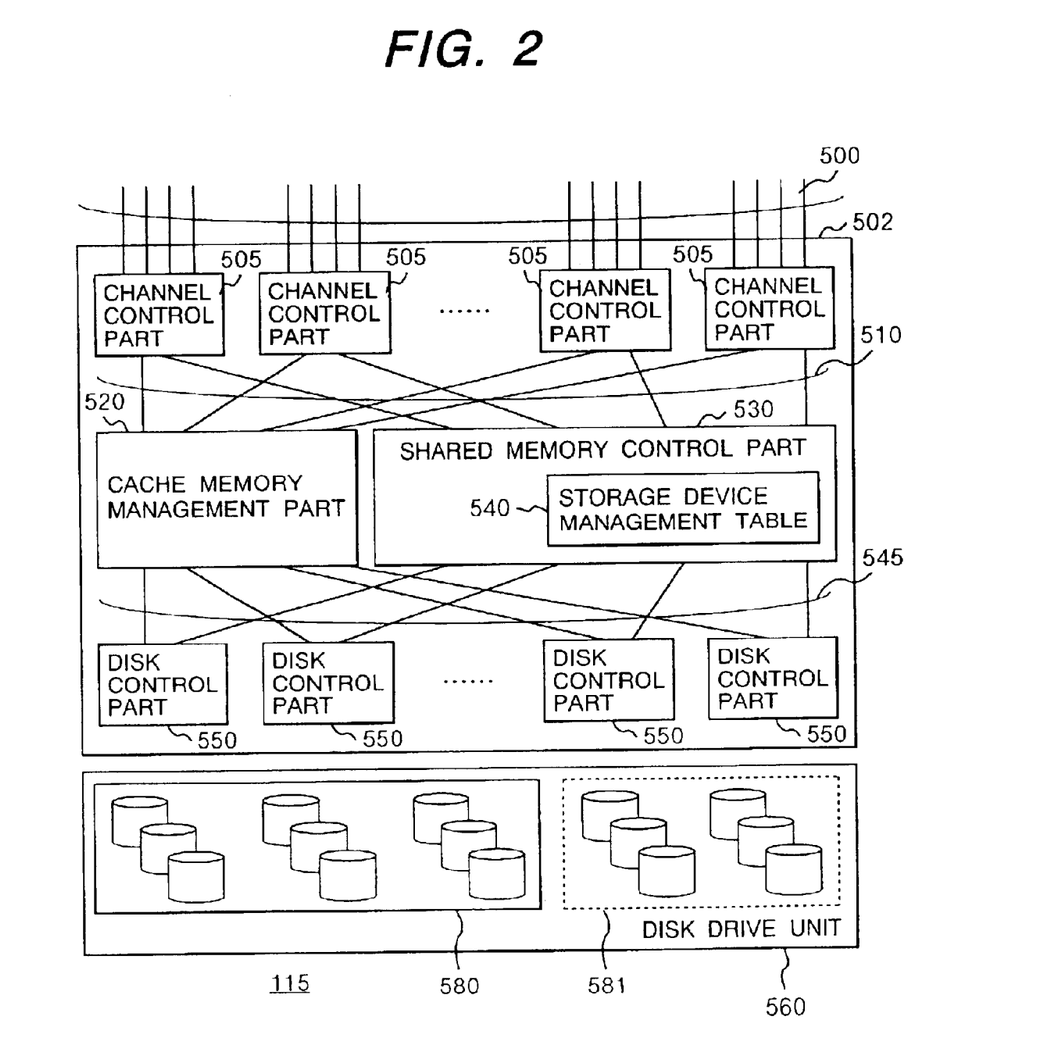
FIG. 2 is a diagram showing a disk subsystem in the first embodiment of the present invention.

FIG. 2 shows an overall configuration of a disk subsystem of the first embodiment of the present invention. This disk subsystem corresponds to the storage device 115 of FIG. 1.

The reference numeral 500 denotes input-output paths for connecting the host computer and channel control parts 505 within the disk control unit 502. The reference numeral 505 denotes channel control parts which have an interface with the host computer, send and receive user data to and from the host computer, and control shared data such as control information within the disk control unit 502. Plural channel control parts 505 exist in the disk control unit 502.

The reference numeral 510 denotes connection paths between the channel control parts, and a cache memory control part and a shared memory control part, through which user data and shared data are communicated.

The reference numeral 520 denotes the cache memory control part which has a cache memory for temporarily storing user data residing in the host computer and the disk drive unit, and controls cache memory access from the channel control parts or disk control parts. The reference numeral 530 denotes a shared memory control part which has control information on communications performed within the disk control unit and a shared memory for storing a storage device management table, and controls shared memory access from the channel control parts or disk control parts.

The reference numeral 540 denotes a storage device management table for managing identification information of the storage devices managed within the disk subsystem.

The reference numeral 545 denotes connection paths between disk control parts, and the cache memory control part and the shared memory control part, through which user data and shared data are communicated.

The reference numeral 550 denotes the disk control parts which control access to the disk drive unit 560 and access to the cache memory and the shared memory. Plural disk control parts 550 exist in the disk control unit 502. The reference numeral 560 denotes the disk drive unit which comprises plural drives and stores user data and other data. The reference numerals 580 and 581 denote disk groups each having one or more disks, to which Name 0 and Name 1 are respectively assigned as device identifiers.

Figure 3:
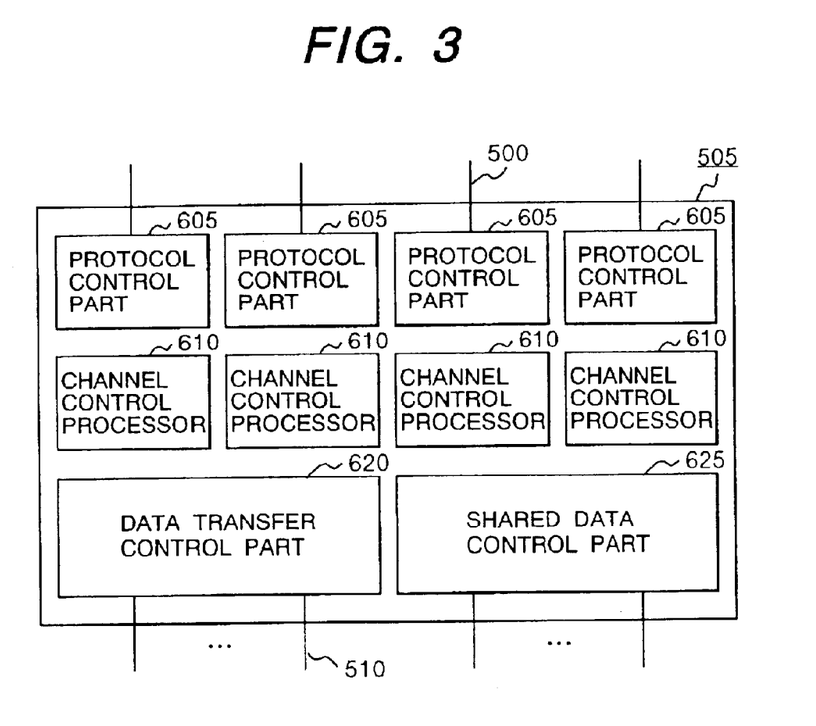
FIG. 3 is a diagram showing the configuration of channel control parts in the first embodiment of the present invention.

FIG. 3 shows configuration blocks of the channel control parts 505 of FIG. 2. In FIG. 3, 605 denotes protocol control parts which receive iSCSI packets, extract SCSI commands and data from the packets, and pass them to channel control processors 610. Also the protocol control parts 605 receive processing results of SCSI commands from the channel control processors 610, creates iSCSI packets, and send them to the host computer through the input-output paths 500. The reference numeral 610 denotes channel control processors which receive SCSI commands and data from the protocol control parts 605, analyze them, and give instructions to the disk control unit according to analyzed requests.

The reference numeral 620 denotes a data transfer control part which, according to instructions from the channel control processor 610, transfers user data sent from the host computer and reads data from the disk drive unit. The reference numeral 625 denote a shared data control part which controls access to a shared memory in which shared data such as control information is stored.

Figure 4:
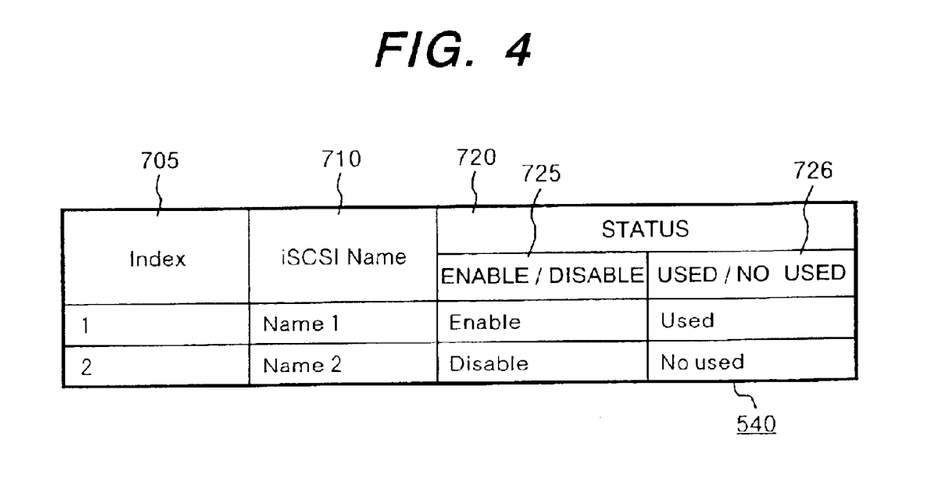
FIG. 4 is a diagram showing a storage device management table in the first embodiment of the present invention.

FIG. 4 shows an example of the storage device management table 540 of FIG. 2. In this storage device management table, storage identification information usable to the disk subsystem 115 is registered in advance. The reference numeral 705 denotes an index field which contains numbers for registered iSCSI names. Plural pieces of storage identification information are given as information for identifying disks of the disk drive unit 560. The reference numeral 710 denotes an iSCSI name as storage identification information, which indicates an iSCSI name usable within the disk subsystem. World Wide Port Name (WWN) may also be used as storage identification information.

The reference numeral 720 denotes a status which indicates the status of iSCSI name registered within the disk subsystem. The reference numeral 725 denotes an enable/disable flag which is indicated as "enable" when access to an iSCSI name is accepted, and as "disable" otherwise. The reference numeral 726 denotes a used/no used flag which is indicated as "used" when an iSCSI name is already used, and as "not used" otherwise.

If access can be made from devices on the network, the enable/disable flag 725 is set to "enable" and the used/no used flag 726 is set to "used". From immediately after a disk group is newly created until it becomes usable, the enable/disable flag 725 is "disable" and the used/no used flag 726 is "used". For iSCSI names not yet used within the disk subsystem, the enable/disable flag 725 is "disable" and the used/no used flag 726 is "not used". Other statuses are defined as inhibited items.

iSCSI names are assigned from the channel control processors or external console. In this case, the channel control processor or external console is assigned iSCSI names with "disable" in the enable/disable flag 725 and "not used" in the used/no used flag 726 from among the storage device management table 540. When a disk group of assigned iSCSI names becomes usable, the storage device management table 540 is updated from the channel control processors or external console. Notification to the storage identification information management device 105 is made when the enable/disable flag 725 becomes "enable" and the used/no used flag 726 becomes "used".

Although the number of entries of iSCSI name is two in the example of FIG. 4, there is no special limitation on the number of entries.

Figure 5:
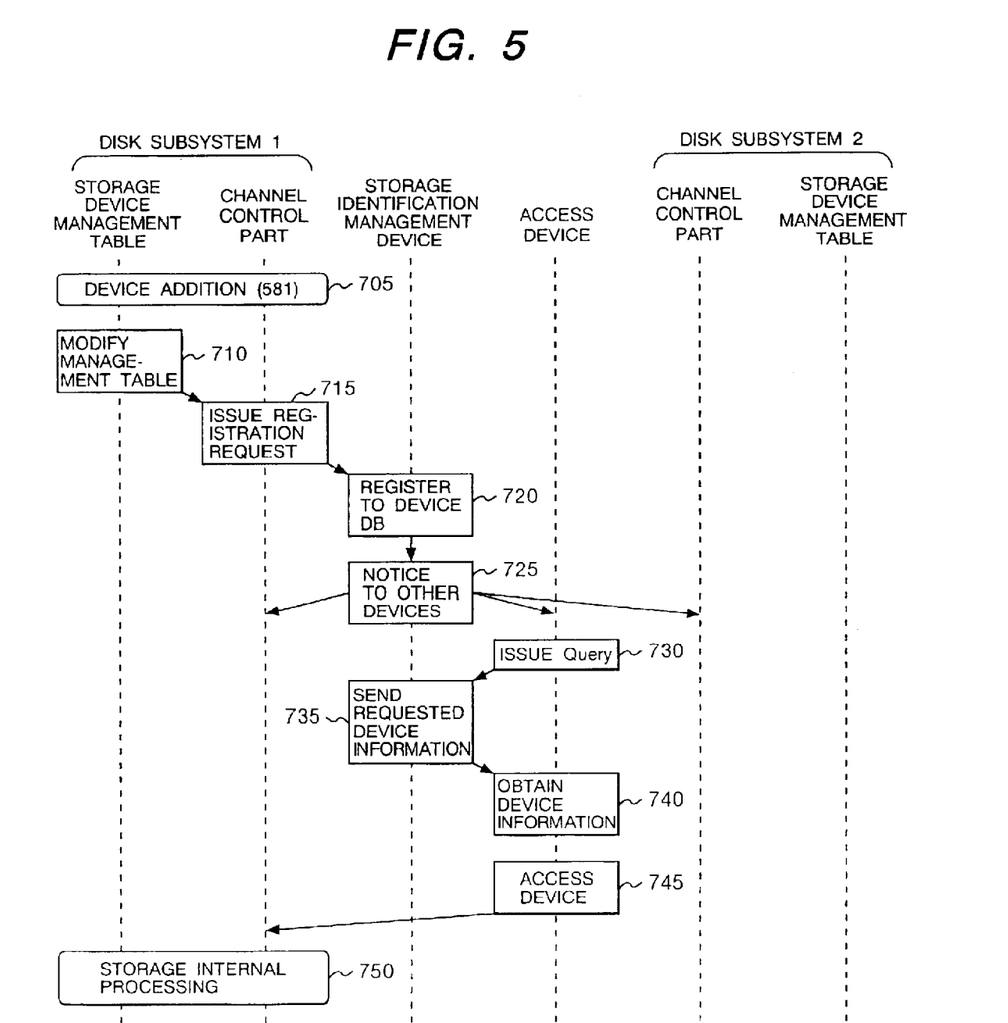
FIG. 5 is a diagram showing a flowchart of access to a new device in the first embodiment of the present invention.

FIG. 5 shows a flowchart after a device is added until the device is made usable, in the first embodiment of the present invention. Herein, a disk subsystem 1 is a subsystem in which the disk subsystem including a device (the disk drive unit 560 including the disk group 580) is added with another device (disk group 581), and as another storage device 115, a disk subsystem 2 is connected to the network.

When the disk subsystem 1, or the storage device 115 having the disk drive unit 560 including the disk group 580, is added with a device (disk group 581) (step 705), the channel control processor of the channel control part 505 within the disk subsystem 1 refer to the storage device management table 540 to assign an iSCSI name to the added device (disk group 581). It decides an iSCSI name to be assigned from among indexes with "disable" and "not used" respectively in the enable/disable flag 725 and the used/no used flag 726 of the storage device management table 540.

Information of dynamic status changes of disks within the disk drive unit 560 is recorded in the storage device management table 540. In other words, the used/no used flag of an selected index is changed from "not used" to "used". Thereafter, after configuration changes and other operations are performed to make the device usable within the disk subsystem 1, the enable/disable flag is changed from "disable" to "enable" (step 710).

Although the above example shows the case in which the storage device management table 540 is updated by the channel control processor 610 to reflect dynamic status changes of disks within the disk drive unit 560, the same is also true for operations from an external console.

For the latter, however, the channel control processor 610 is interrupted to indicate that the device has become usable at the time when the enable/disable flag of the storage device management table 540 has been occurred from "disable" to "enable".

When the enable/disable flag of the storage device management table 540 has been occurred from "disable" to "enable", or an interrupt has been inputted, the channel control processor 610 requests the protocol control part 605 to create a message indicating the change. Upon receipt of the request, the protocol control part 605 creates an update and registration request message and sends it to the storage identification information management device 105 (step 715).

Upon receipt of the message, the storage identification information management device 105 updates the database of managed devices (disk groups 580 and 581) (step 720). At this time, it displays pertinent information on the own device. It issues a status change notice to devices (disk subsystem 2) on the network (step 725). When an access device 100 access to the added device (device group 581), a query is issued to the storage identification information management device 105 to obtain information about the device (step 730).

In response to the query, the storage identification information management device 105 sends pertinent information to the inquiring access device 100 (step 735). The access device accesses the device (disk group 581) according to the received (step 740) information (step 745).

Processing for the access is performed within the disk subsystem 1 (step 750).

Figure 6:
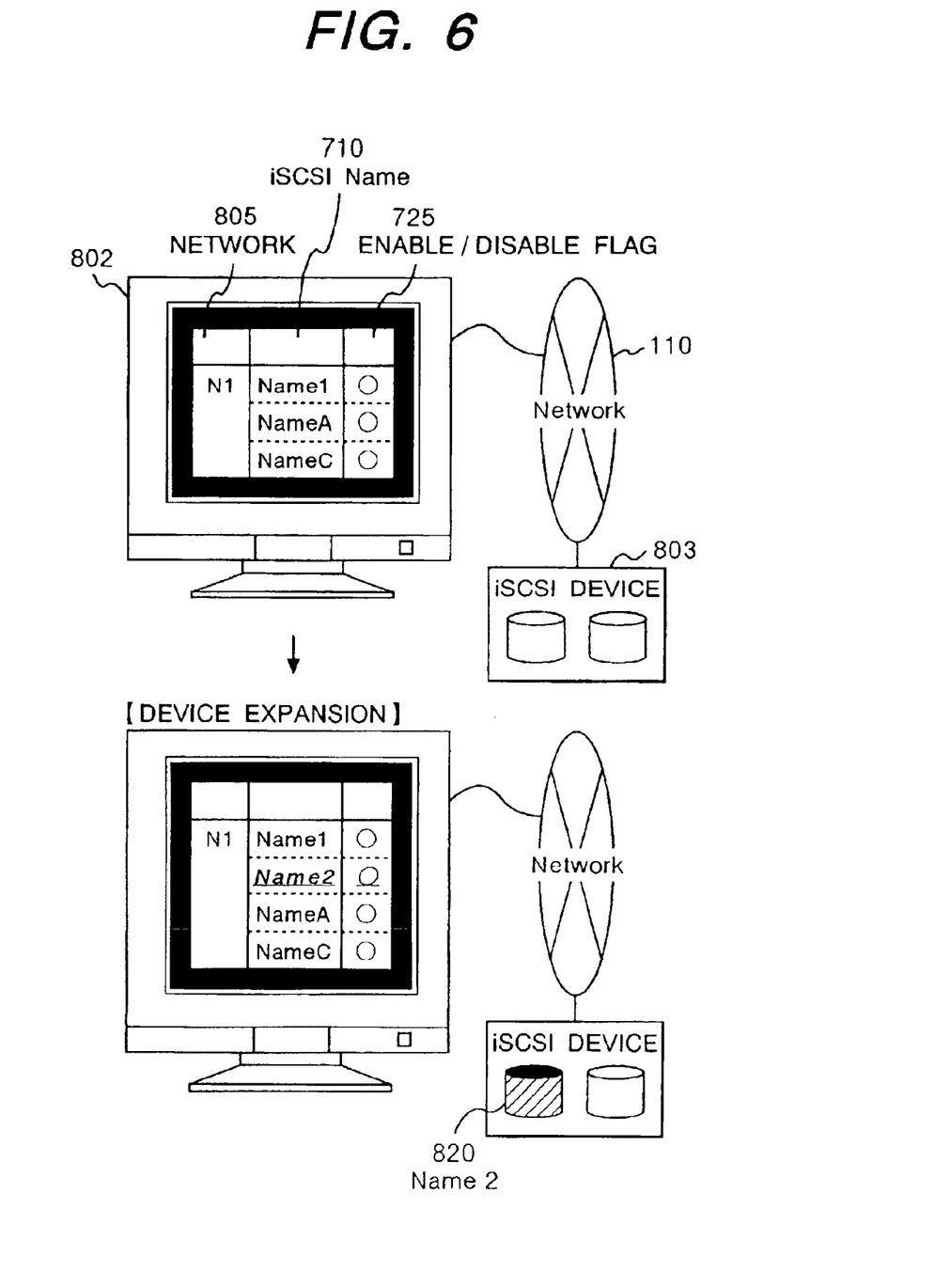
FIG. 6 is a diagram showing an example of information displaying on a storage identification information management device in the first embodiment of the present invention.

FIG. 6 shows an example of information displaying on the storage identification information management device 105 in the first embodiment of the present invention. The reference numeral 802 denotes a display of the storage identification information management device 105. The iSCSI name 710 and the enable/disable flag 725 are displayed on the display 802. The reference numeral 803 denotes the disk subsystem whose details are the same as in FIG. 2. The reference numeral 805 denotes network indexes which are identifiers used within the storage identification information management device 105, given to identify networks in the case where the storage identification information management device 105 manages plural networks. FIG. 6 shows that devices having iSCSI names 710 of Name 1, Name A, and Name C exist in a network 805 of N1, and their use statuses are indicated by the enable/disable flag 725. According to the display 802, in this example, initially ((a) of FIG. 6), devices having Name 1, Name A, and Name C are available.

When a device 820 having Name 2 has been added, the display ((a) of FIG. 6) is updated to the display that the above devices and the device having Name 2 are usable. This is also true for displaying on a management console.

According to the first embodiment shown in FIGS. 2 to 6, the storage device management table 540 for managing device identifiers is provided within the storage device 115 so that information is maintain consistency between the table and the storage identification information management device 105, whereby dynamic status changes within the storage devices 115 as well as on the network can be accommodated.

[Second Embodiment] (Data Movement)

Hereinafter, another second embodiment of iSCSI storage management according to the present invention will be described in detail with reference to the drawings. Portions not described are the same as those in the first embodiment. A difference from the first embodiment is that data volumes within the disk subsystem are moved to other volumes.

Figure 7:
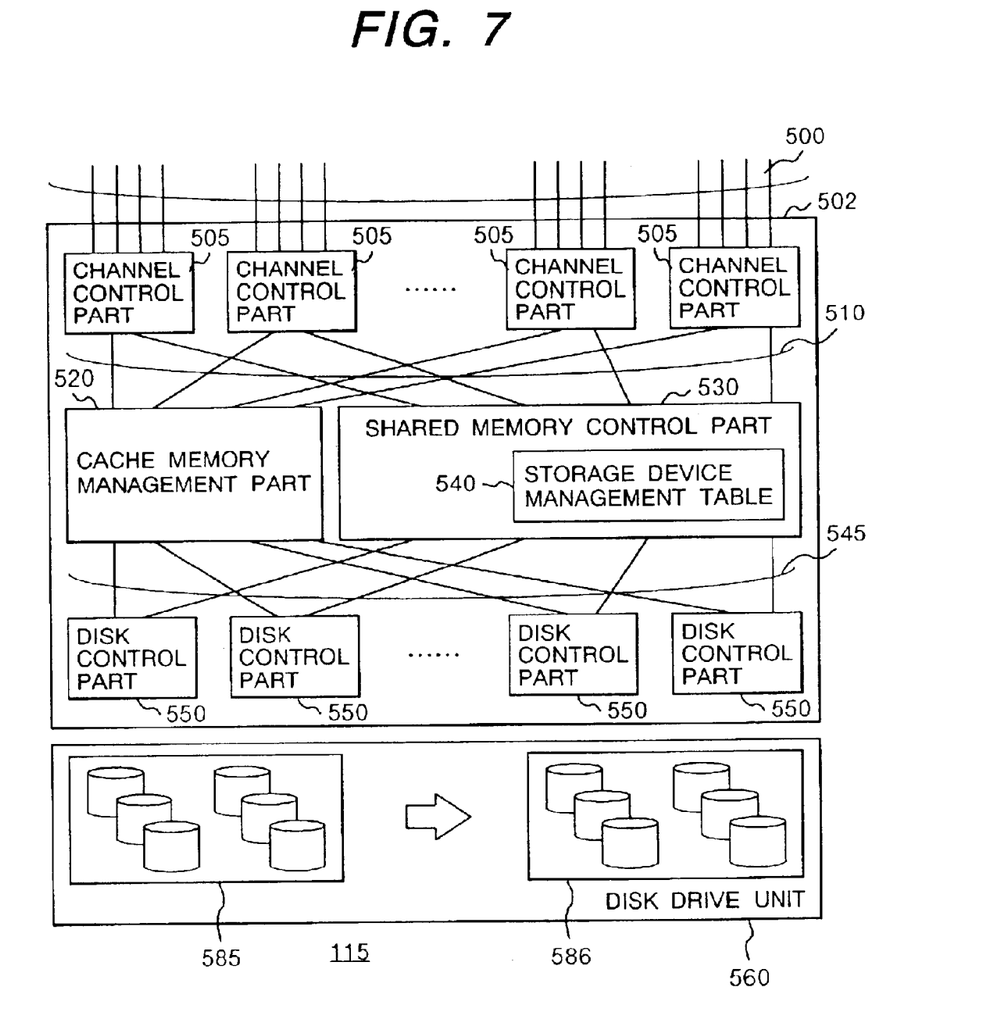
FIG. 7 is a diagram showing a disk subsystem in a second embodiment of the present invention.

FIG. 7 shows a disk subsystem in the second embodiment of the present invention. A difference from the first embodiment is the contents of dynamic status changes of disks within the disk drive unit 560. In the second embodiment, data is moved from a disk group 585 to a disk group 586.

Figure 8:
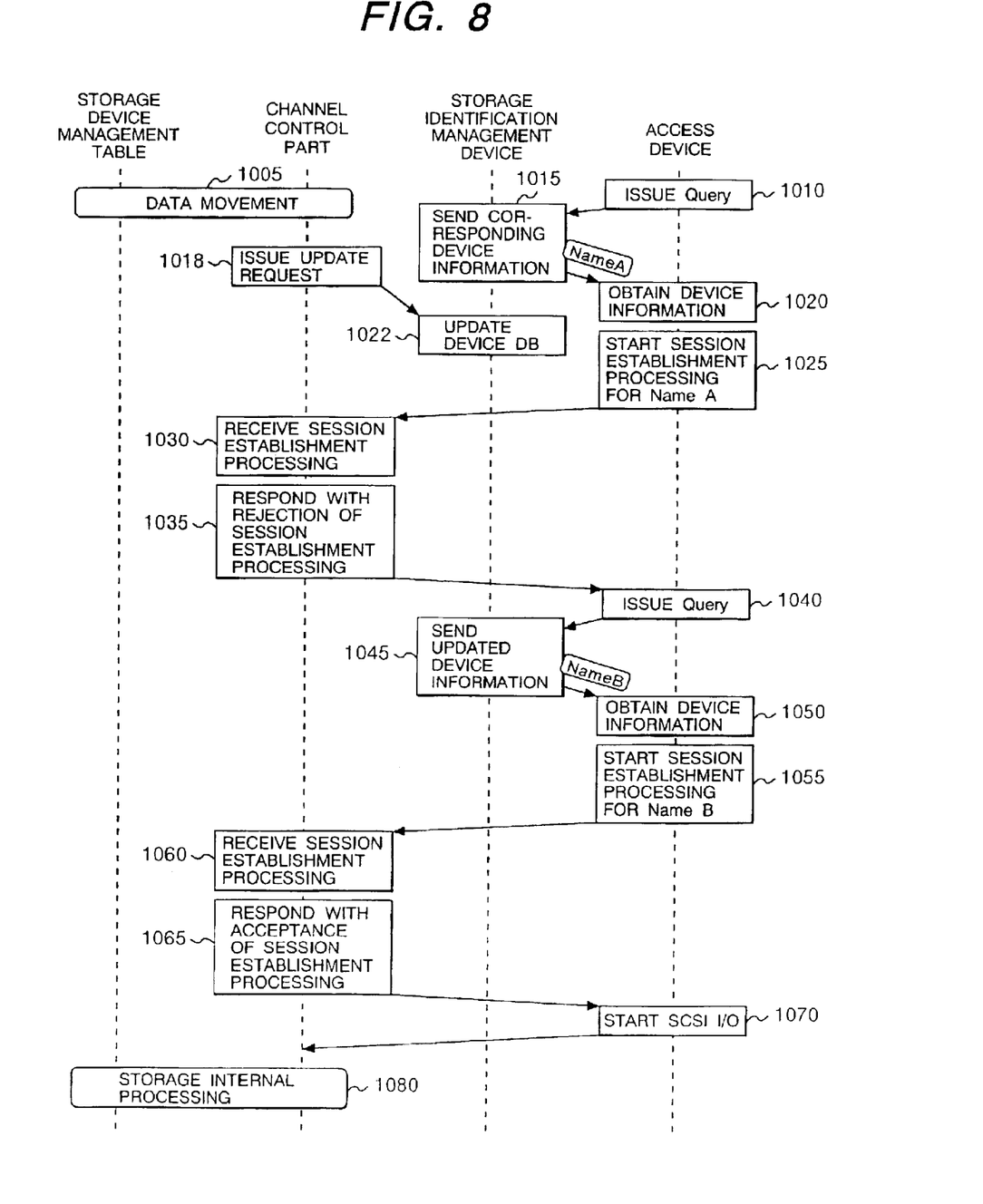
FIG. 8 is a diagram showing a flowchart of access to a device of movement destination in the second embodiment of the present invention.
Figure 9A:
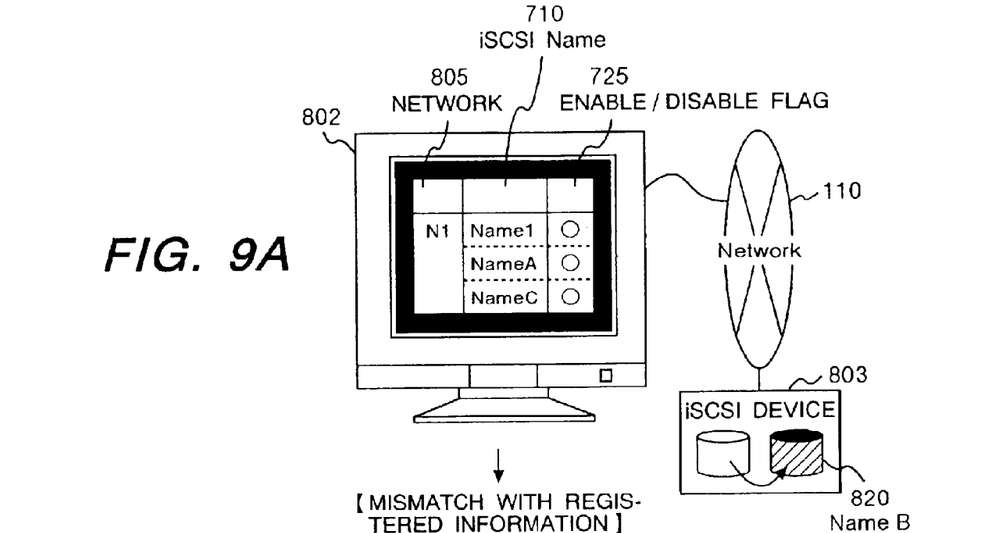
FIG. 9A is a diagram showing an example of information displaying on the storage identification information management device in the first embodiment of the present invention.
Figure 9B:
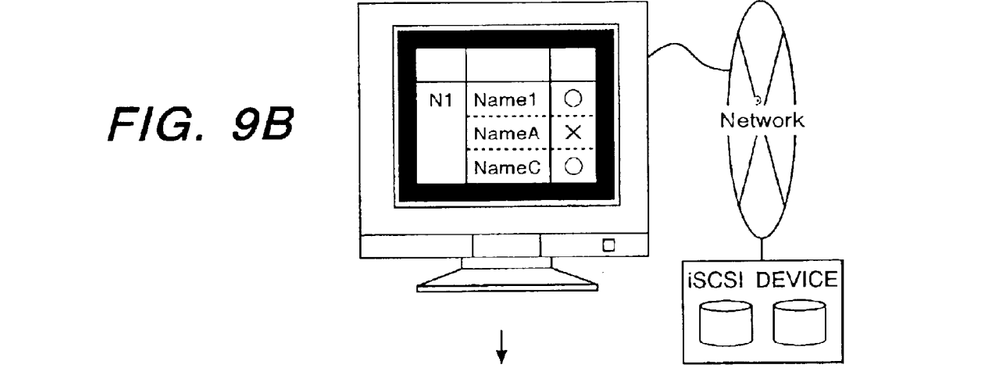
FIG. 9B is a diagram showing an example of information displaying on the storage identification information management device in the first embodiment of the present invention.
Figure 9C:
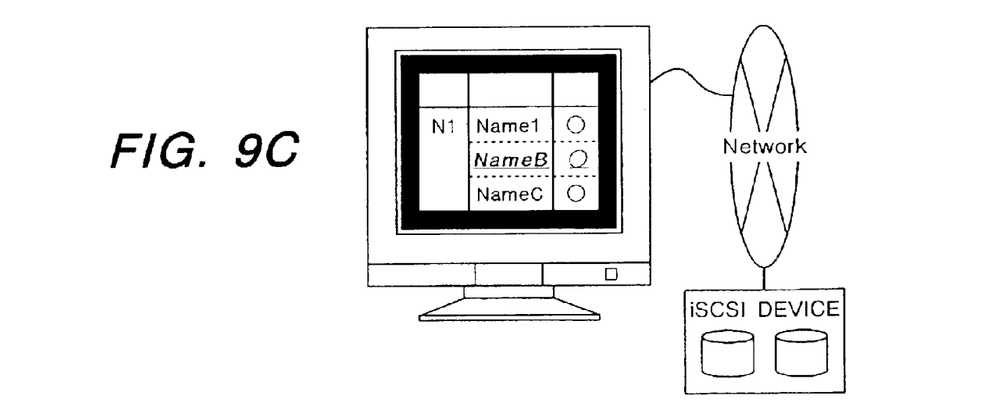
FIG. 9C is a diagram showing an example of information displaying on the storage identification information management device in the first embodiment of the present invention.

FIG. 8 shows a flowchart of access to a device in the second embodiment of the present invention. FIG. 9 shows an example of information displaying on the storage identification information management device 105 in the second embodiment of the present invention.

An access device 100 issues a query to the storage identification information management device 105 to obtain device information (step 1010). The storage identification information management device 105 sends pertinent device information (Name A in this case) to the access device 100 (step 1015).

The access device 100 receives the device information (step 1020) and starts session establishment processing to a channel control part managing a device of Name A (step 1025).

On the other hand, data movement of step 1005 (data movement from the disk group 585 to the disk group 586) occurs between the above described steps 1010 and 1020, and the device of Name A (see FIG. 9A) has been moved to Name C (FIG. 9B). The channel control part 505 issues an update request (step 1018), a status change accompanying the data movement is reflected in the storage identification information management device 105, and the database is updated (step 1022).

The channel control part 505 receives the session establishment processing (step 1030). Since the relevant device has been moved to Name C, information mismatch occurs. As a result, the session establishment processing is rejected in the channel control part 505 (step 1035). The access device 100 issues a query to the storage identification information management device 105 again (step 1040) The storage identification information management device 105 sends updated device information (Name C in this case) to the access device (step 1045).

The access device 100 obtains the updated device information (step 1050), and starts session establishment processing for the channel control part 505 managing the device of Name C (step 1055) Since information matches with respect to the processing, the channel control part 505 establishes a session and sends a response with "accepted" status to the access device 100 (step 1065).

Through the above described procedure, the access device 100 can issue SCSI I/O (step 1070). The disk subsystem starts SCSI I/O processing issued by the access device 100 (step 1080).

Information mismatch that occurred in step 1035 of FIG. 8 is indicated by the enable/disable flag of x as shown in FIG. 9B. Updated information is indicated by ○ as shown in FIG. 9C.

In the first and second embodiments, information defined in iSNS as well as iSCSI names is exchanged between the disk subsystem and the storage identification information management device 105.

Since the iSCSI storage is managed in a manner that not only manages status changes on the network but also exchanges information between storage devices and a device managing the storage devices, the present invention can accommodate dynamic status changes inside the storage devices.

What is claimed is:

1. A disk subsystem comprising:

one or more disk drive units each having one or more disks; and a disk control unit controlling the disk drive units, and coupled with devices accessing the disks via a network, wherein said disk control unit comprises:

a storage device management table for managing said disks within said disk drive units, and a communication unit for sending and receiving information about dynamic status changes of said disks within said disk drive units between said storage device management table and a storage identification information management device existing on said network.

2. The disk subsystem according to claim 1, wherein said storage device management table has, as a unit for indicating information about dynamic status changes of each disk within said disk drive units, at least storage identification information, and flags indicating whether a storage is enabled or disabled, and used or unused.

3. The disk subsystem according to claim 2, wherein said storage identification information is iSCSI name.

4. The disk subsystem according to claim 2, wherein said storage identification information is World Wide Port Name (WWN).

5. The disk subsystem according to claim 1, wherein storage identification information usable by the disk subsystem is registered in advance in said storage device management table.

6. The disk subsystem according to claim 1, wherein storage identification information usable by the disk subsystem is stored in advance in an external console, and stored storage identification information can be set or modified as required.

7. The disk subsystem according to claim 1, wherein each disk of said disk drive units is identified using plural pieces of storage identification information.

8. The disk subsystem according to claim 1, wherein said storage device management table can be modified from an external console through said network or another network different from said network.

9. The disk subsystem according to claim 1, further comprising:

a unit for updating said storage device management table.

10. The disk subsystem according to claim 6, wherein said disk subsystem is a storage device including a disk control unit having an interface with said network, and wherein the disk control unit further comprise:

channel control parts;

disk control parts having an interface with disk drive units;

a network for coupling said channel control parts and said disk control parts;

a memory for temporarily storing data of the disks;

a memory for holding control information about said disk subsystem; and said storage device management table.

11. The disk subsystem according to claim 6, wherein said disk control unit has a unit for reporting to a processor managing the storage device, when a modification to the storage device management table occurs.

12. A storage identification information management device comprising:

a communication unit for, sending and receiving, to and from the storage devices of disk subsystems existing on a network, information about dynamic status changes within disk drive units of the storage devices; and a database update unit for updating a database containing said information of dynamic status changes within managed devices including disk drive units of the storage devices, wherein said communication unit sends and receives said information about dynamic status changes within disk drive units of the storage devices between a storage management table within each disk subsystem and said database.

13. A storage identification information management device comprising:

a communication unit for, sending and receiving, to and from storage devices of disk subsystems existing on a network, information about dynamic status changes within disk drive units of the storage devices;

a database unit for updating a database containing said information of dynamic status changes within managed devices including disk drive units of said storage devices; and a unit for displaying information managed by a storage device management table of said storage devices, said information forming at least a part of said database.

14. The storage identification information management device according to claim 13, wherein when a modification to said storage device management table occurs, the modification is reflected in the displayed contents.

15. A storage management system comprising:

a plurality of disk subsystems existing on a network; and a storage identification information management device managing storage of said disk subsystems, wherein each disk subsystem includes a module, for reporting the internal status change from a storage device management table included in said disk subsystem to the storage identification information management device, when a state changes in the storage within said disk subsystems.

16. A storage management method in an IP networking system having a plurality of disk subsystems existing on a network and a storage identification information management device managing storage of the disk subsystem, said storage management method comprising:

reporting, by each disk subsystem, an internal status change from a storage device management table included in said disk subsystems to the storage identification information management device, when a state changes in said storage within said disk subsystems.

17. The storage management method according to claim 16, wherein the modification to the storage device management table is an addition of a device to storage devices; and various types of information relevant to modification defined by Internet Small Computer System Interface (iSCSI) names and Internet Storage Name Service (iSNS) are exchanged between said disk subsystems and said storage identification information management device.

18. The storage management method according to claim 16, wherein the modification to the storage device management table is movement of a data volume within said disk subsystems to another volume; and various types of information relevant to modification defined by Internet Small Computer System Interface (iSCSI) names and Internet Storage Name Service (iSNS) are exchanged between said disk subsystems and said storage identification information management device.

19. A storage management method in an Internet Protocol (IP) networking system having a plurality of disk subsystems existing on a network and a storage identification information management device managing storage of said disk subsystems, said disk subsystems each including one or more disk drive units each having one or more disks, and a disk control unit controlling said disk drive units, said disk control unit having a storage device management table for managing the disks within said disk drive units, wherein, upon occurrence of a modification to said storage device management table, communication between said storage device management table and said storage identification information management device is performed:

in said disk subsystems according to the following steps of:

modifying said storage device management table from an external console;

reporting a modification to said storage device management table to a processor managing a relevant storage device;

obtaining, by said processor, modified contents from the storage device management table; and sending a message containing the modified contents to the storage identification information management device via said network, and in said storage identification information management device according to the following steps of:

receiving the message and storing or updating the message in said storage identification information management device; and reflecting said modified contents by the storage identification information management device.

20. A storage management method in an IP networking system having a plurality of disk subsystems existing on a network and a storage identification information management device managing storage of said disk subsystems, said disk subsystems each including one or more disk drive units each having one or more disks, and a disk control unit controlling said disk drive units, said disk control unit having a storage device management table for managing the disks within said disk drive units, wherein, upon occurrence of a modification to said storage device management table, communication between said storage device management table and said storage identification information management device is performed:

in said disk subsystem according to the following steps of:

modifying said storage device management table from modification means within the disk subsystems;

reporting modification to said storage device management table to a processor managing a relevant storage device, obtaining, in said processor, modified contents from the storage device management table upon receiving the report; and sending a message containing the modified contents to the storage identification information management device via said network, and in said storage identification information management device according to the following steps of:

receiving the message and storing or updating it in said storage identification information management device; and reflecting said modified contents by the storage identification information management device.

* * * * *